Oct. 28, 1958
S. G. HARRIS ET AL
2,858,222
METHOD OF RECOVERING THE MEAT OF POULTRY
Filed Sept. 27, 1957
2 Sheets-Sheet 1
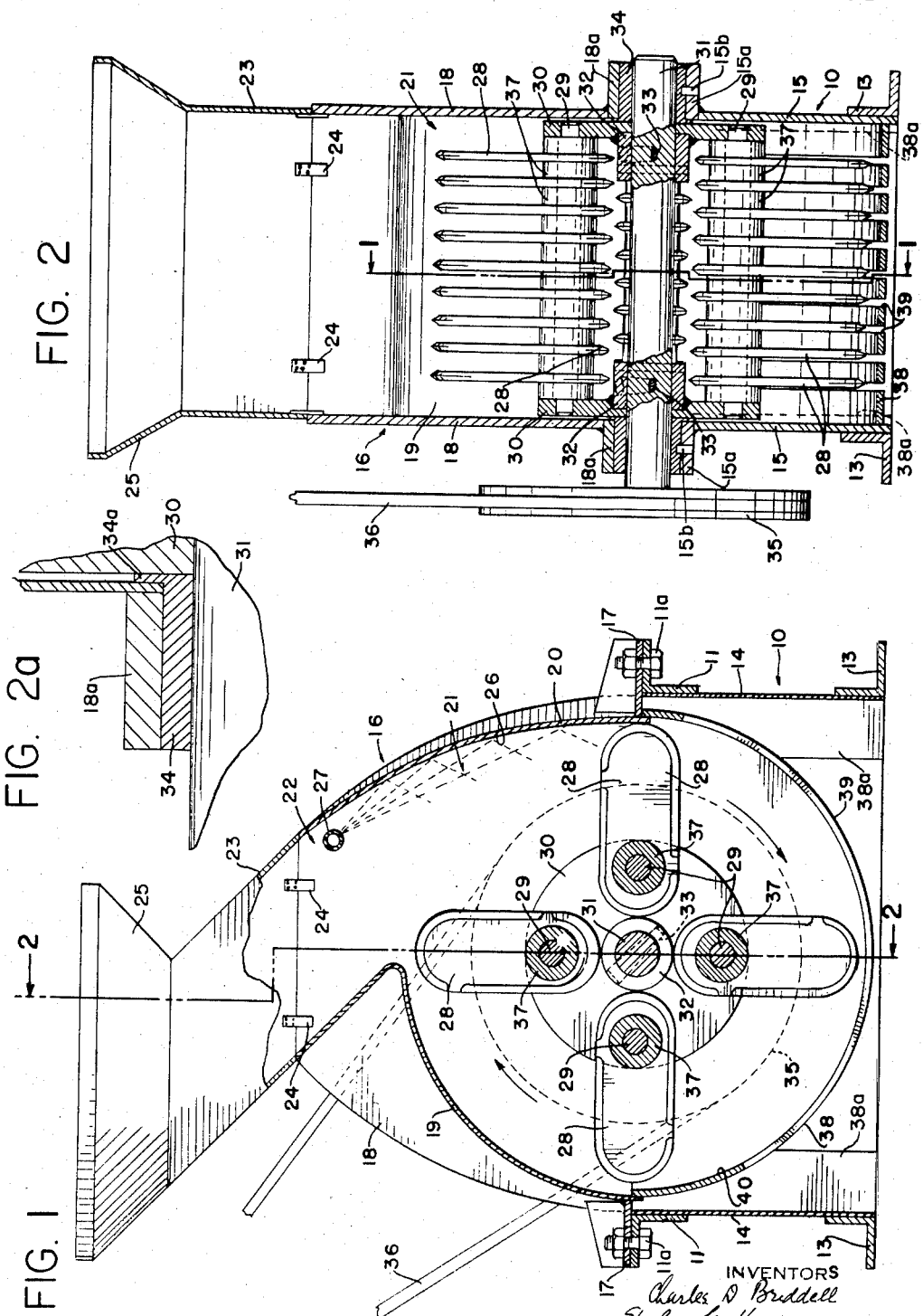
INVENTORS
Charles D. Briddell
Sterling G. Harris
BY
Penna Elmer Morton Barrows Taylor
ATTORNEYS

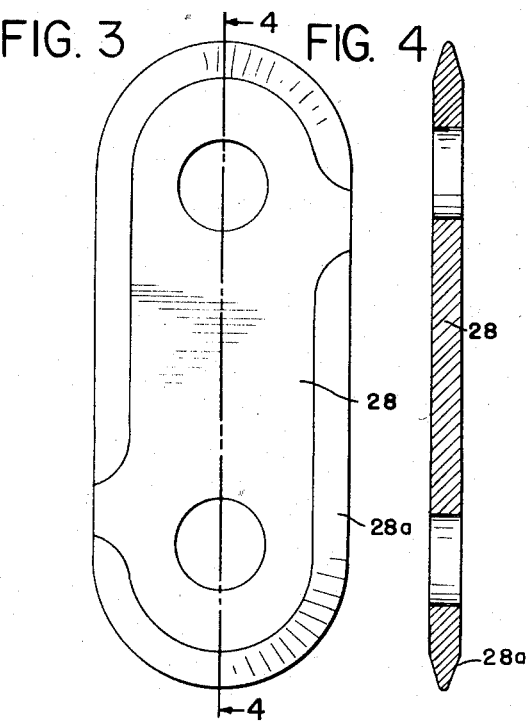
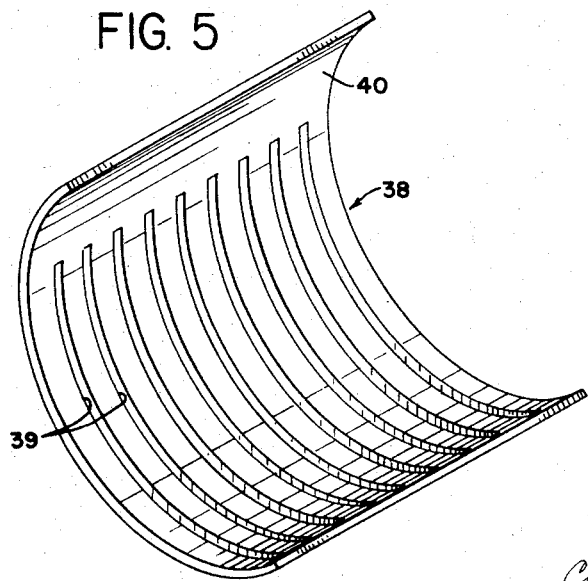

United States Patent Office 2,858,222
Patented Oct. 28, 1958

2,858,222
METHOD OF RECOVERING THE MEAT OF POULTRY

Sterling G. Harris, Beaufort, S. C., and Charles D. Briddell, Crisfield, Md., assignors to The Blue Channel Corp., a corporation of Maryland Application September 27, 1957, Serial No. 686,789

6 Claims. (Cl. 99—107)

This invention relates to the recovery of the meat from the carcasses of poultry, such as chickens, turkeys, etc., and is concerned more particularly with a novel method, by which the meat may be separated from the bony material of poultry more rapidly and efficiently than by the methods now in use.

At present, the boned meat of chickens and turkeys is preserved by canning and sold for use in salads, sandwiches, etc., and large quantities of the meat are used in soups and frozen pies. The recovery of the meat is performed by hand and, in a typical operation, the chickens are received at the packing plant in the form of frozen carcasses, which have been drawn and from which the feathers, heads, necks, and feet have been removed. The carcasses are first thawed by soaking in water and are then cooked in water in an open bath or in a retort for a period depending somewhat on the age and size of the chicken but for at least 3 hours and usually more when open bath cooking is employed. At the completion of the cooking, the carcasses must be cooled to 80°–90° F. to permit handling, after which the skin is removed from the carcasses and they are broken into sections, namely, legs and thighs, wings, breasts, and backs, from which the meat is stripped manually. As the labor charge for boning poultry is high and there is a considerable proportion of the meat not recovered in hand picking, boned chicken and turkey are expensive, but, up to the present, no method of recovering the meat except by hand picking has been available.

The present invention is directed to the provision of a method for separating the meat from the carcasses of poultry, which produces boned meat of as good quality as that obtained by manual operations and at much less cost for labor. As the new method involves less handling of the carcasses and meat, it is more sanitary than hand picking and, in addition, it gives a greater yield of meat from a given weight of carcasses and affords other savings.

In the practice of the new method, the poultry carcasses used are the same as those prepared for hand boning, except that the necks are not removed. Ordinarily, the carcasses arrive at the packing plant frozen and, after being thawed, the carcasses are cooked. The cooking may be done by placing the carcasses in water heated to boiling temperature in an open bath or, if a shorter cooking time is desired, the cooking may be carried on in a closed retort, in which a pressure can be developed so that the temperature may exceed 212° F. The cooking time required is substantially less than that employed when the boning is to be done by hand and the cooking is continued only until the meat begins to shrink away from the bony material. Thus, in the case of a chicken weighing 2½ lbs. to 3½ lbs., the cooking at atmospheric temperature requires from 2 hours and 20 minutes to 2 hours and 35 minutes, which is substantially less than the time required for cooking a chicken of similar size for hand boning, and the shorter cooking time affords a substantial saving in fuel cost. Upon completion of the cooking, the carcasses are subjected at once and without the necessity of cooling to operations for stripping the meat from the bony material.

In the separation of the meat from the carcasses, the carcasses are subjected to impact action effective to release the meat from the bones, after which the material in the condition resulting from the impact action is screened by being caused to travel over long narrow openings extending in the direction of travel of the material, while the material is subjected to a force tending to force it through the openings. The material, which passes the openings, is then introduced into a flotation tank containing a brine of such salinity that the meat floats, while the bony material sinks.

To produce the impact effect, which causes the carcasses to be broken up to a greater or less extent and the meat to be freed from the bony material, the carcasses are struck a heavy blow causing them to travel at high velocity and then abruptly stopped, as by impingement upon a fixed surface. The material resulting from such impact and made up of unbroken portions of the carcasses and pieces of meat and bone freed therefrom is then screened and, in this operation, the material is moved rapidly over an arcuate screen plate slotted in the direction of travel of the material. As a result of the curvature of the plate, the material is subjected in its passage over the plate to centrifugal force tending to force the material through the openings in the plate and any material, which does not pass through the plate, is again subjected to impact and screening as described, until the material passes through the plate. The pieces of meat are then recovered by flotation and, for this purpose, the mixture of meat and bone discharged through the plate slots may be introduced directly into a tank containing a brine solution of proper salinity. The pieces of meat pass off through an overflow from the tank while the bony material is removed from the bottom of the tank and discarded. After rinsing with fresh water by immersion or by a spray, the meat is inspected on a traveling belt and skin particles, heavy veins, pieces of gristle, and any foreign materials are removed. The meat is then ready for packing or for use in pies, soups, etc.

In the practice of the method, two procedures may be followed, depending on the uses to be made of the resulting products. In a procedure employed when only small pieces of meat are desired, as for soups, the whole poultry carcasses may be subjected to impact and screening. In the alternative procedure used when larger pieces of meat are desired, as in the production of meat sold as such or used in pies, or when white and dark meat are to be separately recovered, it is preferable to break up the carcasses and process some parts together and others separately. Thus, the legs and thighs and the wings may be removed from the carcasses and boned separately and the breasts and backs may be broken apart and boned separately. When sections of the carcasses are separately boned, the bony residues derived therefrom may be combined and subjected to the method a second time for recovery of small bits of meat adhering thereto. It is also practical to bone the legs and thighs, the wings, and the breasts in separate operations and combine the bony material remaining with the backs for treatment in accordance with the method. It is not necessary in any case to remove the skin manually from the carcasses, as is done in hand boning, since, in the practice of the new method, the skin is separated from the flesh as well as the flesh from the bones. The skin floats in the brine tank and is deposited with the meat upon the inspection belt where the skin is removed by the inspectors, as above explained.

The steps of the method involving impact and screening can be practiced by the machine disclosed in the patent application of Sterling G. Harris, Ser. No. 638,559, filed February 6, 1957, and a form of the Harris machine suitable for use in the processing of poultry is shown in the accompanying drawings. In these drawings, Fig. 1. is a view of the Harris machine partly in side elevation and partly in vertical section on the line 1—1 of Fig. 2;

Fig. 2 is a view in vertical section on the line 2—2 of Fig. 1;

Fig. 2a is a view of part of Fig. 2 on an enlarged scale;

Fig. 3 is a view in elevation of an impeller used in the machine;

Fig. 4 is a view on the line 4—4 of Fig. 3; and

Fig. 5 is a view in perspective of the slotted plate used in the machine.

The apparatus in the form shown comprises a casing, which includes a lower section 10 generally rectangular in shape and having an open top with transverse end flanges 11 made of angle irons and means at its lower end, such as the angle irons 13 extending across its end and side walls 14, 15, for mounting the apparatus on a support above a receptacle, as, for example, a flotation tank. The casing has an upper section 16, which is provided at its lower end with transverse end flanges 17 adapted to rest upon flanges 11 and to be secured thereto by any suitable means, such as the bolts 11a anchored in openings in flanges 11 and extending through openings in flanges 17. The upper casing section has flat parallel side walls 18 connected by curved walls 19, 20 formed to define the top of a chamber 21, from which a feed chute 22 extends upwardly at an angle to the vertical. The chute may have an extension 23 resting upon the upper end of the chute and held in place by lugs 24 projecting from its lower end and receivable in the upper end of the chute. The extension 23 ordinarily has a flaring peripheral flange 25 at its upper end.

The curved wall 20 of the upper casing section has a portion extending substantially vertically and having a smooth inner area providing an impact surface 26. In the operation of the machine, the impact surface is kept wet by liquid sprayed upon it by means of a pipe 27 with jet openings, which projects through one side wall of the chute 22 and extends toward the opposite wall.

Within the chamber 21, a plurality of impellers 28 are pivotally mounted in sets on rods 29 supported at an angular spacing of 90° in spaced discs 30 mounted on a shaft 31. The discs carry collars 32 secured to their opposed faces by welding and formed with diametrical tapered openings alignable with diametrical tapered bores through the shaft. The discs and shaft are secured together by tapered pins 33, which extend through the openings and enter the bores, and the shaft is mounted for rotation in a pair of bearing bushings 34 supported in lower and upper semi-cylindrical bearing housings 15a, 18a secured by welding in openings in the side walls 15, 18, respectively, of the lower and upper sections of the casing. Each bearing bushing is held against rotation in its housings by a pin 15b, which is mounted in an opening in the lower housing 15a and extends into a bore in the bushing. Each bushing 34 has a radial flange at its inner end, which lies between the discs 30 on the shaft and the side walls 15, 18 and the bearing housings 15a, 18a and acts as a thrust washer. At one end, the shaft carries a pulley 35, about which a driving belt 36 is trained.

The impellers 28 are flat metal plates having an opening near one end, so that they may be slipped on the rods 29 with spacers 37 between adjacent impellers and between the end impellers of the set and the discs 30. The spacers are of such thickness that the impellers are evenly spaced and those on one rod lie opposite the spaces between the impellers on the adjacent rods. Accordingly, two of the rods diametrically disposed carry an even number of impellers and the other two rods carry an odd number. The impellers have rounded ends and may have a length of about 5", a width of about 2", and a thickness of about ¼". Preferably, the impellers have sharpened forward and end edges, as indicated at 28a, and they may be sharpened at both ends and provided with openings near both ends, so that their positions on a rod may be reversed, when the sharpened edge at one end becomes dull. In a machine suitable for operating on poultry, adjacent impellers are spaced ½".

A semi-cylindrical screen plate 38 is mounted in the lower casing below the shaft 31 and out of the path of the impellers carried thereby. For this purpose, supporting plates 38a are secured by welding to the inner faces of the side walls 15 of the lower section of the casing adjacent the end walls 14 and the upper ends of the plates are formed with curved surfaces conforming to the curved lower surface of the screen plate. When the screen plate is in operative position, it rests upon the upper ends of the supporting plates with one end lying against the under side of the flange 17 projecting from the wall 20 of the upper portion section 16 of the casing and its other end lying in slightly overlapping relation to the lower end of the curved wall 19 of the section 16. Upon removal of the upper section of the casing, the screen plate can be removed by being lifted from the supporting plates.

The screen plate 38 is formed with a plurality of parallel lengthwise slots 39 between its ends and, at the end of the plate adjacent the impact surface 26, the slots terminate relatively close to the end of the plate. At the other end of the plate, the slots terminate a substantial distance from the end of the plate to provide a solid area 40 lying approximately diametrically opposite the impact surface 26. The plate 38 is preferably about ¼" thick or somewhat thicker, depending upon the size of the poultry to be processed, with ribs approximately square in cross-section. Plates having slots of different width may be advantageously used for different materials. Thus, when poultry breasts are to be boned, a plate with slots about 1¼" in width is found to give best results in that the meat is less disintegrated than when a plate with narrower slots is used and is recovered in the form of pieces of larger size. For boning legs and thighs, a plate with slots ¾" wide is desirable. A plate with slots of a width of ¼" or 5/16" is best for removing the meat from wings, backs, and necks, the plate with the wider slots being used for larger poultry, such as turkeys. Wings, backs, and necks can be run through the machine separately or in combination with the bones remaining after boning the breasts and the legs and thighs and, in either case, a plate with slots of the widths specified may be used. It is especially advantageous, however, to bone the wings separately, since the meat recovered therefrom is entirely white and considered to be of excellent quality. When small pieces of meat are desired and whole carcasses are fed to the machine, a screen plate with slots of a width of ¼" or 5/16" may best be used, since the meat will then be so fully recovered that it will not be necessary to process the bony material a second time.

In the operation of the apparatus in the practice of the method, the shaft 31 of the machine is driven at a speed which may vary within the range from 250 to 600 R. P. M. If the speed of the impellers is too low, the output of the machine and its efficiency are low, while, if the speed is too high, the meat recovered is in smaller pieces, although a greater production is obtained. A speed of about 300 R. P. M. appears to be the optimum and, with the shaft rotating at the selected speed, the poultry carcasses or the pieces thereof, such as the breasts, are fed into the feed chute and fall into the path of the impellers 28. When a breast, for example, is struck by a set of impellers, it is caused to travel at high velocity across the bottom of the chute and is then abruptly stopped by impingement upon the impact surface 26 of the casing. The impact of the breast against the surface breaks up the breast and frees the meat from the bony material to a greater or less extent and the breast and the pieces of meat and bone are then screened by being moved by the impellers along the arcuate surface of plate 38. During such movement of the material, the centrifugal force applied thereto because of the travel of the material along the curved plate tends to force the pieces of meat and bone through the slots. The remainder of the breast is advanced over the solid area 40 of the plate and along the inner surface of the wall 19 of the upper casing section, until it reaches the open lower end of the chute, where the breast material is again thrown at high velocity against the impact surface 26. Following the second impact, the centrifugal action against takes place and the cycle of operations is repeated, until all of the breast material has been discharged through the slots in plate 38.

The meat and bony material issuing from the machine are separated by flotation in a tank containing a brine of such salinity that the meat floats and the bony material sinks and, if desired, the machine may be mounted above the tank and discharge directly into it. When such an arrangement is used, the pipe 27, which keeps the impact surface 26 wet to keep meat and bony material from sticking to it, is supplied with a brine to avoid dilution of the bath in the tank. A flotation tank suitable for the purpose is illustrated and described in Harris Patent 2,608,716, issued September 2, 1952. The Harris tank has an overflow through which the separated meat may be discharged upon an inspection belt, while the bony material is carried out of the tank by means of an inclined conveyor belt. The bony material produced in the separate operations on the various sections of the carcasses may then be combined and passed again through the machine equipped with a screen plate with the narrowest slots, for example, ¼" or 5/16".

By the practice of the new method, poultry can be boned rapidly and at low cost. A better recovery is obtained than from ordinary hand picking operations and, as the carcasses are handled less, the danger of contamination is reduced. The cooking of the carcasses employed in the practice of the method is of shorter duration than the cooking preliminary to hand picking and, as a result, economies in fuel are effected and the meat retains more moisture and is of better flavor.

Another important advantage afforded by boning poultry by machine, as above described, is the speed with which the poultry can be cooled from the high cooking temperatures down to temperatures low enough to inhibit bacterial growth. In the methods of hand boning now used, the hot cooked poultry must be reduced in temperature to 80° to 90° F. before the carcasses can be skinned and broken apart. The warm carcass sections are then passed on for hand boning and, during this operation and the inspection of the meat, the latter remains for long periods in a range of temperatures best suited for rapid bacterial growth and spoilage before finally reaching temperatures low enough to inhibit further bacterial growth. In the practice of the method by the use of the machine described, the carcasses at the time of being broken apart are at temperatures such as 150 to 175° F., which are too high for growth of most bacteria. The hot carcass sections are then fed to the machines with little or no delay and the meat drops from the machines into the brine in the flotation tanks. The brine is preferably maintained at a temperature from 40 to 50° F., at which bacterial growth is almost completely inhibited. Thus, the period, during which the meat is exposed to temperatures favorable to bacterial growth, is very short and, in addition, there is only a minor amount of manual handling of the carcasses or meat.

In some instances, as at the end of a working day, it may be necessary to hold cooked carcasses overnight and process them the following day. In such a situation, the cooked carcasses are placed in cold storage and such carcasses may be then processed by the machine without being warmed, since the machine has been found to perform its functions equally well on the chilled material and on that material hot from the cooking operation.

We claim:

1. A method of recovering the meat from a drawn poultry carcass, from which the feathers, head, and feet have been removed, which comprises cooking the carcass by heat and moisture until the meat begins to shrink from the bony material, subjecting at least part of the carcass to impact by striking it a blow causing it to travel at high speed and then abrupty stopping it, screening the material resulting from the impact by causing the material to travel over long narrow openings extending in the direction of travel while subjecting the material to a force tending to cause it to pass through the openings, and subjecting the meat and bony material, which have passed through the openings, to a flotation operation, in which the meat floats and the bony material sinks.

2. The method of claim 1, in which the carcass is cooked in hot water.

3. The method of claim 1, in which the whole carcass is subjected to impact and screening.

4. The method of claim 1, in which the legs and thighs and the wings are detached from the cooked carcass, the breast and the back are separated, and the breast and the legs and thighs are subjected in separate operations to impact and screening as described.

5. The method of claim 4, in which the back and the bony material resulting from the processing of the legs and thighs and the breast are combined and subjected to impact and screening.

6. The method of claim 1, in which the material resulting from the impact is caused to travel along a curved path and is thereby subjected to centrifugal force during the screening operation.

References Cited in the file of this patent
UNITED STATES PATENTS

| | | |
|---|---|---|
| 2,608,716 | Harris | Sept. 2, 1952 |
| 2,734,540 | Geisler | Feb. 14, 1956 |
| 2,787,549 | Heald | Apr. 2, 1957 |
| 2,799,584 | Robertson | July 16, 1957 |